United States Patent [19]

Ueno

[11] Patent Number: 5,781,775
[45] Date of Patent: Jul. 14, 1998

[54] PARALLEL PROCESS SCHEDULING METHOD IN A PARALLEL COMPUTER AND A PROCESSING APPARATUS FOR A PARALLEL COMPUTER

[75] Inventor: Haruhiko Ueno, Kawasaki, Japan

[73] Assignee: Fujitsu Ltd., Kawasaki, Japan

[21] Appl. No.: 677,984

[22] Filed: Jul. 10, 1996

[30] Foreign Application Priority Data

Oct. 27, 1995 [JP] Japan .................. 7-281021

[51] Int. Cl.⁶ .................................. G06F 9/00
[52] U.S. Cl. ........................ 395/672; 395/800.21
[58] Field of Search .............. 395/200.31, 200.38,
395/800.01, 800.1, 800.21, 800.28, 800.32,
825–827, 868, 182.08, 182.09, 733, 670,
672, 676, 376, 390, 391, 553; 364/131–133

[56] References Cited

U.S. PATENT DOCUMENTS

| | | | |
|---|---|---|---|
| 5,193,186 | 3/1993 | Tamaki et al. | 395/676 |
| 5,339,415 | 8/1994 | Strout, II et al. | 395/672 |
| 5,438,680 | 8/1995 | Sullivan | 395/670 |
| 5,504,881 | 4/1996 | Sirurget | 395/183.14 |
| 5,590,323 | 12/1996 | Kartalopoulos | 395/676 |
| 5,615,127 | 3/1997 | Beatty et al. | 364/489 |
| 5,649,106 | 7/1997 | Tsujimichi et al. | 395/200.51 |

FOREIGN PATENT DOCUMENTS

| | | |
|---|---|---|
| 63-85858 | 4/1988 | Japan . |
| 2-110763 | 4/1990 | Japan . |
| 5-290005 | 11/1993 | Japan . |

*Primary Examiner*—Alpesh M. Shah
*Attorney, Agent, or Firm*—Staas & Halsey

[57] ABSTRACT

A method and a processing apparatus for use in a parallel computer realizing a coordinate scheduling which does not degrade a throughput performance of a system. According to this invention, if a parallel process in execution gets into a parallel synchronization waiting state, the parallel process is deactivated so that allocation of the parallel process is inhibited, a process of another executable job is allocated, instead. If a setting condition is satisfied during the execution of another job, an interruption signal for a process in execution is generated to activate the parallel process in the parallel synchronization waiting state, thereby resuming allocation of this parallel process. This invention may be applied to a parallel computer system of a distributed main storage MIMD type which implements plural tasks in parallel by plural PEs.

14 Claims, 11 Drawing Sheets

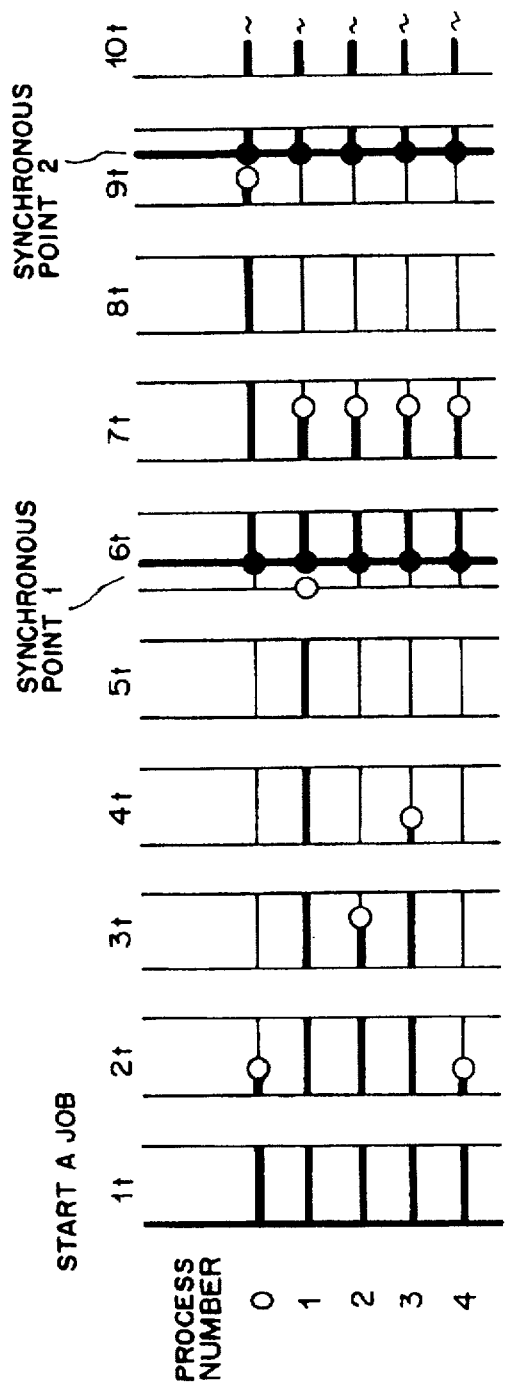

PARALLEL PROCESS SCHEDULING METHOD IN A PARALLEL COMPUTER AND A PROCESSING APPARATUS FOR A PARALLEL COMPUTER

BACKGROUND OF THE INVENTION

1) Field of the Invention

The present invention relates to a parallel process scheduling method applied when a certain job is executed by two or more processing apparatus while being synchronized in each step in a parallel computer configured with plural processing apparatus [hereinafter referred as PEs (Processor Elements)] communicably connected to each other, and a processing apparatus applied this method thereto. In particular, the present invention relates to a technique suitable for use in a parallel computer of a distributed main storage MIMD (Multiple Instruction stream Multiple Data stream) type which implements plural tasks in parallel by plural PEs.

2) Description of the Related Art

In recent years, the necessity to process enormous data at a high speed as in a numerical computation, image processing or the like requires a high-speed or large-capacity computer system. Accompanying this, there have been searched and developed a parallel processing technique using plural PEs to process in parallel while the plural PEs communicate with each other.

In a parallel computer system, n PEs (assuming that #0 through n-1 are given as PE numbers to the PEs, respectively) 101 are, in general, communicably connected to each other over an inter-PE coupling network 100 as a communication network as shown in FIG. 9, for example.

Each of the PEs 101 has a transfer processing unit 102, an instruction processing unit (CPU) 103 and a main storage 104 as shown in FIG. 10.

The transfer processing unit 102 performs a transmitting/receiving process on data on the main storage 104. The instruction processing unit 103 performs a programing process upon communication among the PEs 101.

The transfer processing unit 102 and the instruction processing unit 103 are separately provided as above, thereby cutting a load on and an overhead of the instruction processing unit 103. The transfer processing unit 102 is so configured as to perform a transmitting process and a receiving process concurrently and in parallel, thereby improving a data transfer speed and a data transfer efficiency.

In a parallel computer of a distributed main storage MIMD type, one job is generally executed as a process in parallel (hereinafter referred as a parallel process) by plural different PEs 101. A job such executed is called a parallel job. Further, a multiple executing function for plural parallel jobs, or a multiple executing function for a parallel job and a non-parallel job is demanded in recent years.

If plural parallel jobs (or a parallel job and a non-parallel job) are executed in a multiplex fashion in a system, it is necessary to schedule processes on each PE 101 to implement a process switching (a switching of processes). If the parallel process is scheduled without coordinating the plural PEs 101 at that time, there rises a problem that a wait time for synchronization of the parallel process due to microscopic differences in executing time of the parallel process increases. To avoid an increase of the synchronization wait time, it is necessary to coordinately schedule the plural PEs 101, that is, to implement an inter-PE coordinate scheduling, in a scheduling of a parallel process.

FIG. 11 shows an example of a general parallel process scheduling if only one parallel job is being executed in a system. In the example shown in FIG. 11, one job is being executed in parallel as five processes given process numbers 0 through 4, respectively, on five PEs 101. Each of the processes is being executed in synchronization with each other in each step as indicated by synchronous points 1 and 2.

On the other hand, FIG. 12 shows an example where a synchronous scheduling called a gang scheduling is implemented as an inter-PE coordinate scheduling for a parallel process. In the example shown in FIG. 12, one job is being executed in parallel as five processes given process numbers 0 through 4, respectively, on five PEs 101. Each of the processes is being executed in synchronization with each other in each step as shown by synchronous points 1 and 2, similarly to the example shown in FIG. 11.

According to the gang scheduling, all parallel processes are simultaneously allocated with reception of a broadcasted process switch instruction or with that timers synchronized with each other in the PEs 101 show a due time as an opportunity. In the example shown in FIG. 12, processes (omitted in FIG. 12) of another parallel job or non-parallel job are dispatched (allocation) in each time slice.

According to such synchronous scheduling, an increase of the synchronous overhead among processes due to a process switching of parallel processes does not occur. In addition, a performance can be improved by a factor of a rate of executing time of a parallel job per unit time as compared with a case where only one parallel job is operated in the system as shown in FIG. 11.

In FIGS. 11 and 12, t shows a time slice, "○" hows a point of time at which each of the processes gets into a parallel synchronization waiting state (that is, a point of time at which a process allocated in this step has been just completed), and "●" shows a point of time at which parallel synchronization (barrier) is detected in each PE 101 executing each process (that is, a point of time at which every PE 101 executing this parallel process has just completed a process allocated in this step).

A thick line in the horizontal direction shows a period during which a process is actually executed, and a thin line in the horizontal direction shows that a process is in the parallel synchronization waiting state. As shown by the thin line, each process is dispatched (allocation) to each slice time until parallel synchronization is detected even if it is in the parallel synchronization waiting state and no process is actually executed.

According to the parallel process scheduling shown in either FIG. 11 or 12, each process is dispatched to each time slice until parallel synchronization is detected even if it is in the synchronization waiting state and no process is actually executed.

In consequence, there is a problem that a time lice is given to a parallel process being in the parallel synchronization waiting state even if there exists another executable process so that a throughput performance of an entire system degrades if there is a difference in process time of each parallel process.

SUMMARY OF THE INVENTION

In the light of the above problem, an object of the present invention is to realize a coordinate scheduling which does not dispatch a parallel process in the parallel synchronization waiting state but dispatches another executable job process so as to prevent a throughput performance of the system from degrading.

The present invention therefore provides a parallel process scheduling method used in a parallel computer having plural processing apparatus for executing processes individually and a communication network for communicably connecting the plural processing apparatus to each other to execute a certain job as a parallel process in synchronization in each step by two or more processing apparatus among the plural processing apparatus, the parallel process scheduling method comprising the steps of, if each of the processing apparatus completes a process allocated in this step as the parallel process and gets into a parallel synchronization waiting state where said processing apparatus waits for another more than one or more processing apparatus to complete processes allocated in this step as the parallel processes, in a processing apparatus in the parallel synchronization waiting state in respect to the parallel process, deactivating the parallel process in order to inhibit allocation of the parallel process, setting a condition that should be satisfied when allocation of the parallel process is resumed, allocating a process of the another job if the another job executable by the processing apparatus exists, and generating an interruption signal for a process in execution when said condition is satisfied to activate the parallel process so as to resume allocation of the parallel process.

The present invention also provides a processing apparatus for a parallel computer communicably connected to another plural processing apparatus over a communication network to constitute a parallel computer for executing a certain job as a parallel process in synchronization with another one or more processing apparatus among the plural processing apparatus in each step, the processing apparatus comprising a deactivating mechanism for deactivating the parallel process in order to inhibit allocation of the parallel process if the processing apparatus completes a process allocated in this step as the parallel process and gets into a parallel synchronization waiting state where the processing apparatus waits for the one or more processing apparatus to complete processes allocated as the parallel process in this step, a condition setting mechanism for setting a condition that should be satisfied when allocation of the parallel process is resumed simultaneously with deactivation of the parallel process by the deactivating mechanism, a allocating mechanism for allocating a process of another job while the parallel process is in a deactivated state if another executable job exists, an interruption generating mechanism for generating an interruption signal for a process in execution if the condition is satisfied, and an activating mechanism for activating the parallel process in order to resume allocation of the parallel process according to the interruption signal from the interruption generating mechanism.

According to a parallel process scheduling method used in a parallel computer and a processing apparatus for a parallel computer according to this invention, a coordinate scheduling such that a process of another executable job is dispatched instead of a parallel process being in the parallel synchronization waiting state in a multiple job environment where plural parallel jobs are concurrently executed or a parallel job and a non-parallel job are concurrently executed becomes possible so that a throughput performance of a parallel computer in such multiple job environment may be largely improved.

BRIEF DESCRIPTION OF THE DRAWINGS

FIG. 12 is a diagram showing an example where a gang scheduling is implemented as an inter-PE coordinate scheduling for parallel processes.

DESCRIPTION OF THE PREFERRED EMBODIMENTS (A) Description of an Aspect of the Present Invention FIG. 1 is a block diagram showing an aspect of the present invention. As shown in FIG. 1, a parallel computer 1 to which a parallel process scheduling method of this invention is applied has plural processing apparatus (hereinafeter referred as PEs) for executing processes individually, and a communication network 3 for communicably connecting the plural PEs 2 to each other. In the parallel computer 1, a certain job is executed as parallel processes in synchronization in each step by two or more PEs 2 among the plural PEs 2.

Figure 1:
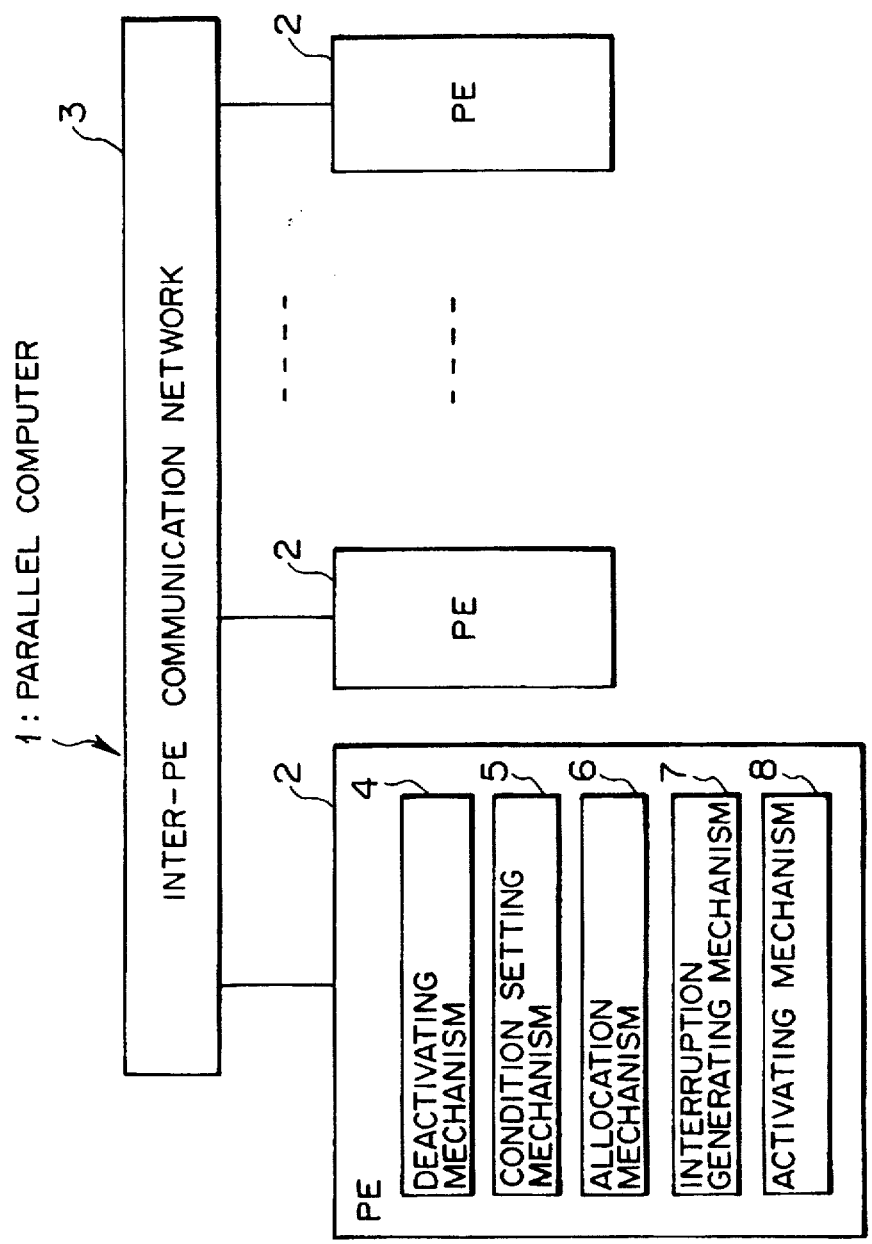
FIG. 1 is a block diagram showing an aspect of this invention.

Each of the PEs 2 has a deactivating mechanism 4, a condition setting mechanism 5, an allocating mechanism 6, an interruption generating mechanism 7 and an activating mechanism 8.

The deactivating mechanism 4 is a mechanism for deactivating a parallel process in order to inhibit allocation of the parallel process if its own PE 2 completes a process allocated in this step as the parallel process and gets into a parallel synchronization waiting state where its own PE waits for another PEs 2 to complete processes allocated in this step as the parallel process.

The condition setting mechanism 5 is a mechanism for setting a condition that should be satisfied when allocation of the parallel process is resumed simultaneously with deactivation of the parallel process by the deactivating mechanism 4. The allocating mechanism 6 is a mechanism for allocating a process of another job while the parallel process is in a deactivated state if another executable job exists.

The interruption generating mechanism 7 is a mechanism for generating an interruption signal for a process in execution if the condition set by the condition setting mechanism 5 is satisfied. The activating mechanism 8 is a mechanism for activating the parallel process in order to resume allocation of the parallel process according to an interruption signal from the interruption generating mechanism 7.

In the PE 2 having the above mechanisms 4 through 8 described above, if a parallel process in execution gets into the parallel synchronization waiting state, the deactivating mechanism 4 deactivates the parallel process so as to inhibit allocation of the parallel process. If another executable job exists instead of this parallel process, the allocating mechanism 6 allocates a process of this another job.

If the condition set by the condition setting mechanism 5 is satisfied during execution of this another job, the interruption generating mechanism 7 generates an interruption signal for the process in execution, after that, the activating mechanism 8 activates the parallel process in the parallel synchronization waiting state to resume allocation of this parallel process.

As above, a parallel process in the parallel synchronization waiting state is not dispatched. Instead of that, a process of another executable job is dispatched, then allocation of the parallel process is resumed when a predetermined condition is satisfied to perform a process in the next step, whereby a coordinate scheduling for a parallel process is realized.

There are three kinds of techniques of realizing the interruption generating mechanism 7 as described in items [1] through [3] below.

[1] Interruption generating mechanism according to the number of transferred packets If a transfer processing unit for transferring data is provided in each PE 2 in the parallel computer 1 in order to transfer data (a packet) to a receiver side PE 2 from a transmitter side PE 2 over the communication network 3 in packet transmission implemented asynchronously with a data processing operation, the interruption generating mechanism 7 may be configured with a counter, an expected value register, a comparator and an interruption generating circuit.

The counter counts the number of packets transferred from another PEs 2 executing a parallel process by counting up or counting down the same when the parallel process gets into the parallel synchronization waiting state. The expected value register is set thereto an expected value of a count value obtained by the counter by the condition setting mechanism 5 on the basis of the number of packets which are intended to be transferred from another PEs 2 from when the parallel process gets into the parallel synchronization waiting state to when another PEs 2 complete a step of this time. The comparator compares an expected value set in the expected value register with an actual count value counted by the counter. The interruption generating circuit generates the interruption signal according to a result of comparison by the comparator.

In the PE 2 having the interruption generating mechanism 7 with the above structure, if a parallel process in execution gets into the parallel synchronization waiting state, the number of packets transferred from another PEs 2 to own PE 2 executing the parallel process is counted by count-up or count-down by the counter.

If the comparator detects that an actual count value obtained by the counter and an expected value set in the expected value register set by the condition setting mechanism 5 agree with each other, the interruption generating circuit generates an interruption signal. In other words, it is possible to accomplish the interruption generating mechanism 7 with that the number of transferred packets reaches the expected value as a condition to resume allocation of the parallel process (a condition to release the parallel synchronization waiting state).

If plural jobs are individually executed as parallel processes on the parallel computer 1, a process identifier corresponding to each job is set in a packet, an expected value is set for each process identifier in each PE 2, a region in which a count value obtained by the counter is stored is ensured on the main storage for each process identifier, and counting by the counter, setting of an expected value and generation of an interruption signal are implemented for each process identifier, thereby deactivating/activating the parallel process for each job.

[2] Interruption generating mechanism according to a quantity of received message packets In the parallel computer 1, each of the PEs 2 is provided with a transfer processing unit for transferring data (a packet) in order to transfer data from the transmitter side PE 2 to the receiver side PE 2 over the communication network 3 in packet transmission implemented asynchronously with a data processing operation. When receiving a message packet which is a packet of a specific type from another PE 2 executing the parallel process, the transfer processing unit stores the received data in a message receiving queue that is a cyclic queue on the main storage according to an added value of a base address and a write pointer, besides updating an indicated value of the write pointer to make it be a leading address of the next free region of the message receiving queue.

At this time, the interruption generating mechanism 7 may be configured with an expected value register, a comparator and an interruption generating circuit.

The expected value register is set thereto an expected value of an indicated value of the write pointer of the transfer processing unit by the condition setting mechanism 5 on the basis of information such as a data capacity and the like of all message packets that are intended to be transferred from another PEs 2 from when the parallel process gets into the parallel synchronization waiting state to when another PEs 2 complete a step of this time. The comparator compares an expected value set in the expected value register with an actually indicated value of the write pointer. The interruption generating circuit generates the interruption signal according to a result of comparison by the comparator.

In the PE 2 having the interruption generating mechanism 7 with the above structure, if a parallel process in execution gets into the parallel synchronization waiting state and the PE 2 receives a message packet from another PE 2 executing the parallel process, the received data is stored in the message receiving queue that is a cyclic queue on the main storage according to an added value of a base address and a write pointer. In addition, an indicated value of the write pointer is updated to be a leading address of the next free region in the message receiving queue.

If the comparator detects that the actually indicated value of the write pointer agrees with the expected value set in the expected value register by the condition setting mechanism 5, the expected value disagrees with the actually indicated value, or the actually indicated value exceeds the expected value, the interruption generating circuit generates an interruption signal. In other words, the interruption generating mechanism 7 may be accomplished with that a quantity of received message packets reaches the expected value as a condition to resume allocation of the parallel process (a condition to release the parallel synchronization waiting state).

If plural jobs are executed as parallel processes separately on the parallel computer 1, a process identifier corresponding to each job is set in a packet, an expected value and a base address are set for each process identifier, the message receiving queue and the write pointer are provided for each process identifier, and data writing to the message receiving queue, updating of the write pointer, setting of the expected value and generation of the interruption signal are implemented for each process identifier in each PE 2, thereby deactivating/activating the parallel process.

[3] Interruption generating mechanism according to synchronization detection (barrier detection)

If each of the PEs 2 is provided with a state communicating unit for transmitting/receiving a state value of one or more bits representing whether each of the PEs 2 completes a process allocated in this step as the parallel process or not among the plural PEs 2, and a synchronization detecting mechanism for outputting a synchronization detection signal if detecting that state values from PEs executing the parallel process obtained through the state communicating unit all agree with each other, the condition setting mechanism 5 sets that a synchronization detection signal is outputted from the synchronization detecting mechanism as the condition so that the interrupting generating mechanism 7 is realized with the synchronization detecting mechanism by using the synchronization detection signal from the synchronization detecting mechanism as the interruption signal.

In the PE 2 having the interruption generating mechanism 7 with the above structure, the synchronization detection mechanism of the PE 2 outputs a synchronization detection signal as an interruption signal of the interruption generating mechanism 7 after the parallel process in execution has got into the parallel synchronization waiting state. In other words, the interruption generating mechanism 7 may be accomplished with synchronization detection (barrier detection) of each PE 2 as a condition to resume allocation of the parallel process.

If plural jobs are executed as parallel processes separately on the parallel computer 1, a process identifier corresponding to each job is set in a packet, the synchronization detecting mechanism realizing the interruption generating mechanism 7 is provided for each process identifier, and synchronization detection by the synchronization detecting mechanism and generation of an interruption signal are implemented for each process identifier, thereby deactivating/activating the parallel process for each job.

According to the parallel process scheduling method used in the parallel computer 1 and the processing apparatus 2 for a parallel computer according to this invention, a coordinate scheduling to dispatch a process of another executable job instead of a parallel process in the parallel synchronization waiting state becomes feasible in a multiple job environment where plural parallel jobs are concurrently executed or a parallel job and a non-parallel job are concurrently executed, as described above. It is therefore possible to largely contribute to an improvement of a throughput performance of the parallel computer 1 in such multiple job environment.

An interruption signal is generated with that the number of transferred packets reaches an expected value, a quantity of received message packets reaches an expected value or synchronization is detected as a condition to release the parallel synchronization waiting state (a interruption generating condition) to resume allocation of the parallel process to proceed to the next step, whereby the parallel process may be executed as usual.

By generating interruption for each process identifier corresponding to each job, it is possible to deactivate/activate the parallel process for each job even if plural jobs are executed as parallel processes separately on the parallel computer 1.

(B) Description of a Parallel Computer According to Embodiments

Figure 2:
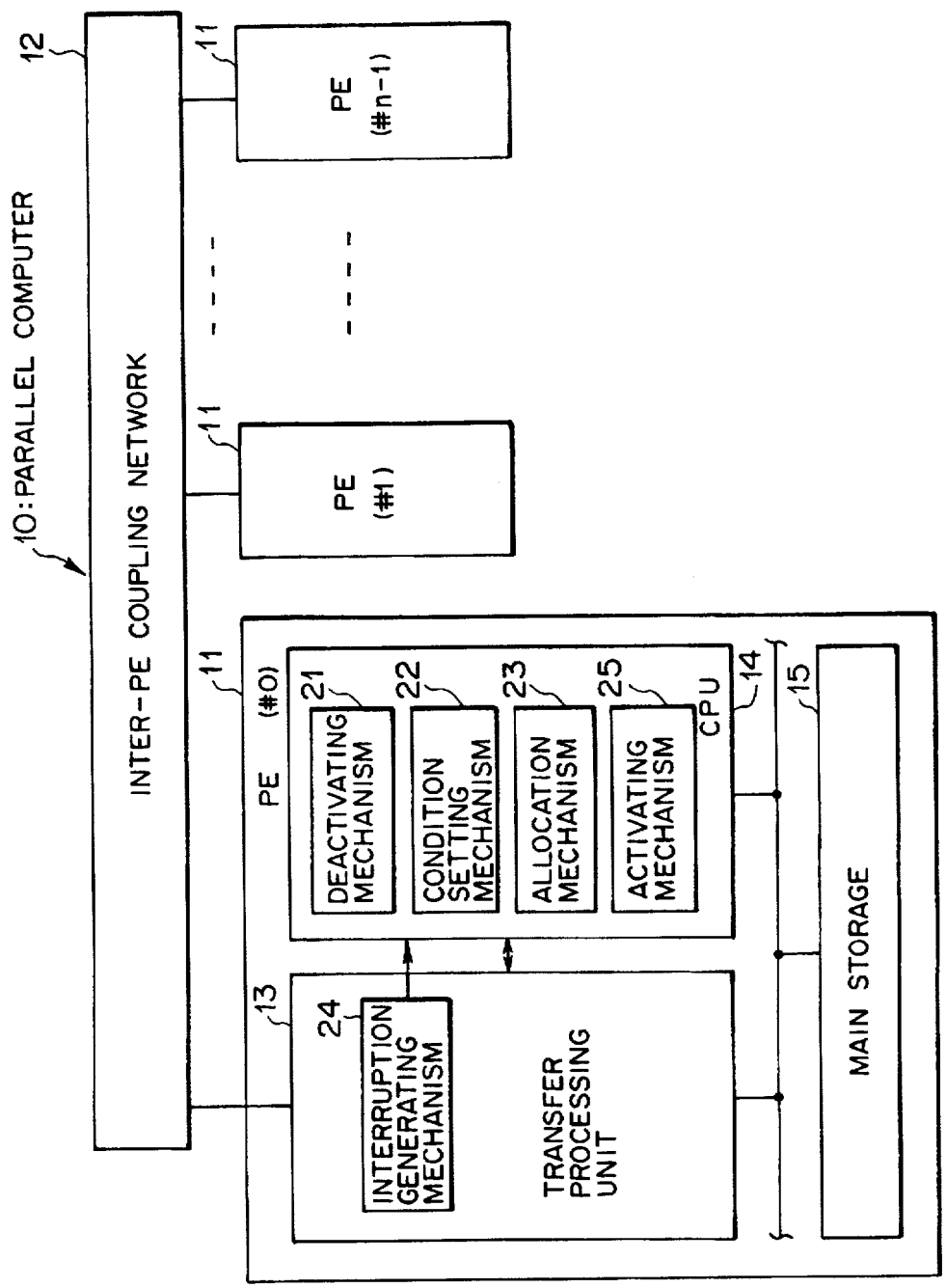
FIG. 2 is a block diagram showing an entire structure of a parallel computer to which a parallel process scheduling method according to an embodiment of this invention is applied.

FIG. 2 is a block diagram showing an entire structure of a parallel computer to which a parallel process scheduling method according to an embodiment of the present invention is applied. As shown in FIG. 2, a parallel computer 10 according to this embodiment has n PEs (given PE numbers #0 through #n-1, respectively) 11 individually executing processes, and an inter-PE coupling network 12 communicably connecting these PEs 11 to each other, similarly to that shown in FIG. 1. One job is executed as a parallel process while being synchronized in each step by two or more PEs 11 among the n PEs 11.

Each PE 11 has at least a transfer processing unit 13, a CPU 14 and a main storage 15, as inscribed in blocks of the PE 11 given a PE number #0 in FIG. 2. In FIG. 2, an inside of only the PE 11 given a PE number #0 is shown, but another PEs 11 of PE numbers #1 through #n-1 are, of course, configured similarly and have various mechanisms described later.

The transfer processing unit 13 performs a transmitting/receiving process on data on the main storage 15 to transfer data to another PE 11 over the inter-PE coupling network 12 in packet transmission in asynchronization with a data processing operation by the CPU 14. The transfer processing unit 13 (or a synchronization detecting mechanism 61, which will be described later in a third embodiment, of the PE 11) is provided with an interruption generating mechanism 24 described later. A detailed structure or an operation of the transfer processing unit 13 (a structure of the interruption generating mechanism 24, in particular) will be described later with reference to FIGS. 4 through 8.

The CPU 14 performs a data processing operation (an actual executing operation of a parallel process) on the basis of various data, programs and the like on the main storage 15, besides making a data transfer instruction to the transfer processing unit 13. The CPU 14 has a deactivating mechanism 21, a condition setting mechanism 22, an allocating mechanism 23 and an activating mechanism 25.

The deactivating mechanism 21 deactivates a parallel process in order to inhibit allocation of the parallel process if its own PE completes a process allocated in this step as the parallel process and gets into a parallel synchronization waiting state where the PE 11 waits for another PEs 11 to complete processes allocated in this step as the parallel process.

The condition setting mechanism 22 is a mechanism for setting a condition (a condition to release the parallel synchronization waiting state) that should be satisfied when an allocation of the parallel process is resumed simultaneously with deactivation of the parallel process by the deactivating mechanism 21. The allocating mechanism 23 is a mechanism for allocating a process of another job while the parallel process is in a deactivated state if there is another executable job.

The interruption generating mechanism 24 is a mechanism for generating an interruption signal to a process in execution if a condition set by the condition setting mechanism 22 is satisfied. The activating mechanism 25 is a mechanism for activating the parallel process according to an interrupt signal from the interruption generating mechanism 24 in order to resume allocation of the parallel process.

Incidentally, the deactivating mechanism 21, the condition setting mechanism 22, the allocating mechanism 23 and the activating mechanism 25 are actually mechanisms realized by a supervisor that is a fundamental part of an OS (Operating System) as will be described later. Here, the supervisor is a program resident in the main storage 15 to control mechanisms for time sharing, input/output, multiprogramming and the like, which is an OS in a narrow sense.

Next description will be of an operation (that is, a parallel process scheduling method according to this embodiment) of each PE 11 with the above structure.

If a parallel process now executed by the CPU 14 gets into the parallel synchronization waiting state in each PE 11, a system call representing that the parallel process has got into the parallel synchronization waiting state is issued accompanied with the above condition from the parallel process.

The supervisor having received the system call sets parameters of the transfer processing unit 13 (the interruption generating mechanism 24) in order to cause the interruption generating mechanism 24 to generate an interruption signal when the notified condition is established, at the same time, shifting the parallel process now in the parallel synchronous waiting state into in a deactivated state so as to prevent the parallel process from being dispatched (the above is by the deactivating mechanism 21 and the condition setting mechanism 22).

In the CPU 14, the allocating mechanism 23 allocates a process of another job (another parallel job or non-parallel job) if there is any executable job excepting the parallel process in the parallel synchronization waiting state.

If the above condition set on the side of the transfer processing unit 13 (or the synchronization detecting mechanism 61) by the condition setting mechanism 5 establishes during execution of another job, an interruption signal to a process in execution is generated by the interruption generating mechanism 24 and outputted to the CPU 14. The supervisor notified the interruption signal activates the parallel process being in the parallel synchronization waiting state (by the activating mechanism 25) to resume dispatch of the parallel process.

Figure 3:
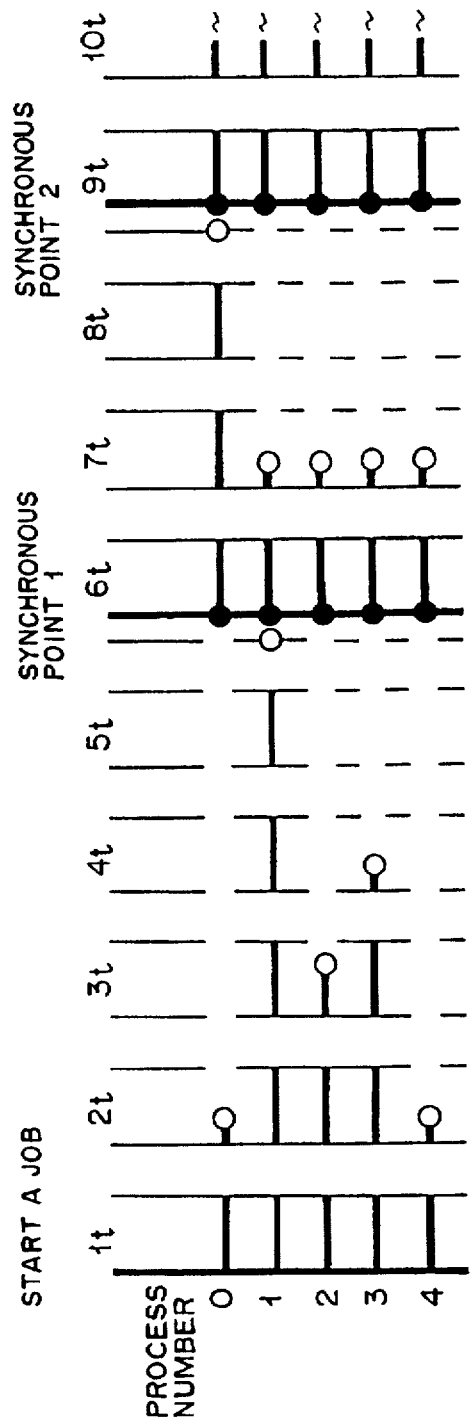
FIG. 3 is a diagram for illustrating a function of the embodiment.

FIG. 3 is a diagram illustrating a function of this embodiment. FIG. 3 corresponds to the gang scheduling described hereinbefore and shown in FIG. 12. In an example shown in FIG. 3, a parallel job is being executed in parallel as five processes given process numbers 0 through 4, respectively, on five PEs 11 similarly to the example shown in FIG. 12. Each of the processes is synchronously executed in each step as indicated by synchronous points 1 and 2.

In FIG. 3, t represents a time slice. "ο" represents a point of time at which each process gets into the parallel synchronization waiting state and issues a system call (that is, a point of time at which a process allocated in this step is just completed), and "●" represents a point of time at which the condition establishes in each of the PEs 11 so that an interruption signal is generated by the interruption generating mechanism 24. A thick line in a horizontal direction shows a period for which a process is actually in execution.

The scheduling method according to this embodiment shown in FIG. 3 differs from the general scheduling method shown in FIG. 12 in a point that thin lines in a horizontal direction shown in FIG. 12 are omitted. Namely, each process is heretofore dispatched to each time slice until parallel synchronization is detected even in a state where the process is in the parallel synchronization waiting state and no process is actually being executed. According to this embodiment, a parallel process in the parallel synchronization waiting state is not dispatched, whereby it is possible to dispatch another process to a time slice becoming newly free of the CPU 14 until the condition establishes.

As a result, in a multiple job environment where plural parallel jobs are concurrently executed or a parallel job and a non-parallel job are concurrently executed, a coordinate scheduling such as to dispatch a process of another executable job instead of a parallel process in the parallel synchronization waiting state becomes possible so that a throughput performance of the parallel computer 10 in such multiple job environment may be largely improved.

Figure 11:
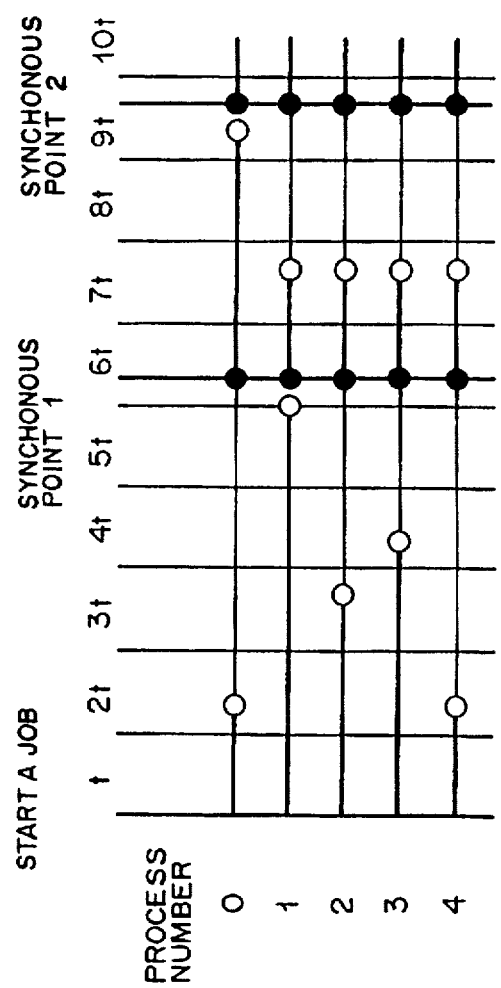
FIG. 11 is a diagram showing an example of a general parallel process scheduling.

FIG. 3 shows an example where this invention is applied to a gang scheduling. It is however possible to apply this invention to the general parallel process scheduling shown in FIG. 11 in a manner similar to the above, by which a function and an effect the same as those of this embodiment are available, needless to say.

Next, three embodiments realizing the interruption generating apparatus 24 in each PE will be described in detail with reference to FIGS. 4 through 8.

Figure 4:
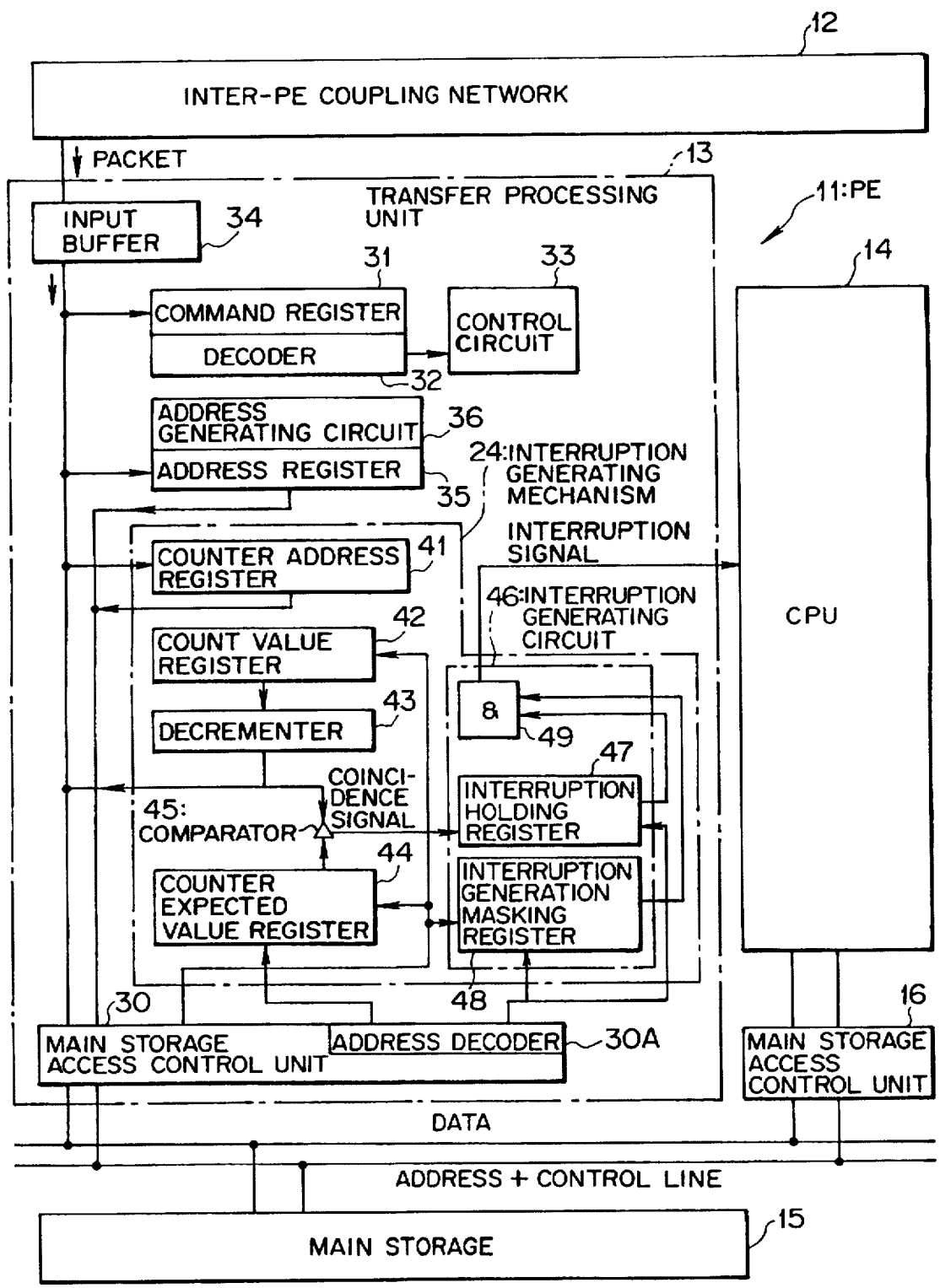
FIG. 4 is a block diagram showing a structure of an essential part of a processing apparatus for a parallel computer according to a first embodiment of this invention.

(C) Description of a Processing Apparatus for a Parallel Computer According to a First Embodiment FIG. 4 is a block diagram showing a structure of an essential, part of a processing apparatus for a parallel computer according to a first embodiment of this invention. In FIG. 4, there are shown in detail a receiving system in the transfer processing unit 13 and the interruption generating mechanism 24 added to the receiving system. However, a transmitting system originally provided to the transfer processing unit 13 is omitted in FIG. 4.

In FIG. 4, reference numeral 16 denotes a main storage access control unit for the CPU 14. The main storage access control unit 16 accesses to the main storage 15 according to an instruction from the CPU 14 to control data transfer from the main storage 15 to the CPU 14 or data transfer from the CPU 14 to the main storage 15.

In FIG. 4, reference numeral 30 denotes a main storage access control unit constituting a part of the transfer processing unit 13. The main storage access control unit 30 accesses to the main storage 15 according to an instruction from the receiving system and the transmitting system of the transfer processing unit 13 to control data transfer from the main storage 15 to the transmitting system or data transfer from the receiving system to the main storage 15. Further, a function to set data to various registers (described later) in the interruption generating mechanism 24 is provided as an address decoder 30A to the main storage access control unit 30.

As shown in FIG. 4, the receiving system of the transfer processing unit 13 of the PE 11 according to the first embodiment has a command register 31, a decoder 32, a control circuit 33, an input buffer 34, an address register 35 and an address generating circuit 36.

The command register 31 temporarily retains a transfer command (a command code) included in a header of a received packet when receiving data from the inter-PE coupling network 12. The decoder 32 analyzes a command code retained in the command register 31. The control circuit 33 controls each part of the receiving system on the basis of a result of the analysis by the decoder 32.

The input buffer 34 temporarily retains a packet received from the transmitter side PE 11 over the inter-PE coupling network 12. Data of the packet body retained in the input buffer 34 is combined with an address indicated in the address register 35 as will be described later with reference to a flowchart shown in FIG. 5 to be successively stored in the main storage 15 via the main storage access control unit 30.

The address register 35 temporarily retains an address on the main storage 15 in which the packet body retained in the input buffer 34 should be written. In the address register 35, address data designated by a header of the received packet (a packet body address date) is retained, thereafter address data generated by the address generating circuit 36 is retained.

When the address data designated by the header is set in the address register 35, the address generating circuit 36 adds one data store byte length to an address value set in the address register 35 each time data is written from the input buffer 34 in the main storage 15. A result of the addition is set in the address register 35. The adding process by the address generating circuit 36 is performed until reception (writing) of the packet body is completed.

The interruption generating mechanism 24 is added to the receiving system of the above-mentioned transfer processing unit 13. The interruption generating mechanism 24 in the PE 11 according to the first embodiment is realized with a counter address register 41, a counter value register 42, a decrementer 43, a counter expected value register 44, a comparator 45 and an interruption generating circuit 46 as shown in FIG. 4.

The counter address register 41 retains a receive counter address designated by a header of a received packet. According to the first embodiment, the number of packets transferred from another PEs 11 in respect to the parallel process getting into the parallel synchronization waiting state is counted as will be described later. A receive counter address retained in the counter address register 41 designates an address on the main storage 15 in which a result of the count (a count value) should be stored.

The count value register 42 retains a count value read out from the receive counter address on the main storage 15 (the address retained in the counter address register 41) via the main storage access control unit 30 each time a packet in respect to the parallel process getting into the parallel synchronization waiting state is received.

The decrementer 43 subtracts 1 from a count value retained in the count value register 42. A result of the subtraction is outputted to the comparator 45, besides written in the receive counter address on the main storage 15 via the main storage address control unit 30. A result of the subtraction obtained by the decrementer 43 is written in a receive counter address on the main storage 15 as above, thereby updating a count value that is information about the number of received packets in respect to the parallel process having got into the parallel synchronization waiting state.

According to the first embodiment, the above-mentioned counter address register 41, counter value register 42 and decrementer 43 realize a function as a counter for counting the number of packets transferred from another PEs 11 executing a parallel process in the parallel synchronization waiting state by counting down the same.

The counter expected value register 44 is set thereto a predetermined counter expected value by the condition setting mechanism 22 of the above-mentioned CPU 14 (the supervisor) through the main storage access control unit 30 (the address decoder 30A) when the parallel process now in process gets into the parallel synchronization waiting state. The counter expected value is set on the basis of the number of packets that will be transferred from another PEs 11 from when the PE 11 gets into the parallel synchronization waiting state to when another PEs 11 complete a step of this time. For instance, if a count value at a receive counter address on the main storage 15 is "8" and the number of packets that will be received from when the PE 11 gets into the parallel synchronization waiting state is "6", "2" is set as the predetermined counter expected value.

The comparator 45 compares a counter expected value set in the counter expected value register 44 with an output value (an actual count value) of the decrementer 43, and outputs a coincidence signal [a signal becoming "0" (a Low level) in the case of disagreement, and "1" (a High level) in the case of agreement] when these values coincide with each other.

The interruption generating circuit 46 generates an interruption signal to the CPU 14 (the supervisor) according to a result of the comparison by the comparator 45. The interruption generating circuit 46 has an interruption holding register 47, an interruption generation masking register 48 and an AND gate 49.

The interruption holding register 47 retains a coincidence signal from the comparator 45, and outputs the held signal to the AND gate 49.

The interruption generation masking register 48 is set thereto mask information used to set in advance whether an interruption is generated or not from the CPU 14 side, and outputs the set information to the AND gate 49. As the mask information, "1" is set if an interruption is generated, or "0" is set if an interruption is not generated (that is, if a signal from the interruption holding register 47 is masked).

The AND gate 49 calculates a logical product of a signal from the interruption holding register 47 and a signal from the interruption generation masking register 48, and outputs the result as an interruption generating signal to the CPU 14. More specifically, when a coincidence signal from the comparator 45 rises so as to cause a signal retained in the interruption holding register 47 to be "1" if "1" is set as the mask information in the interruption generation masking register 48, an interruption generating signal that is to be outputted to the CPU 14 from the AND gate 49 rises and becomes "1" so that an interrupting process is performed in the CPU 14.

Figure 5:
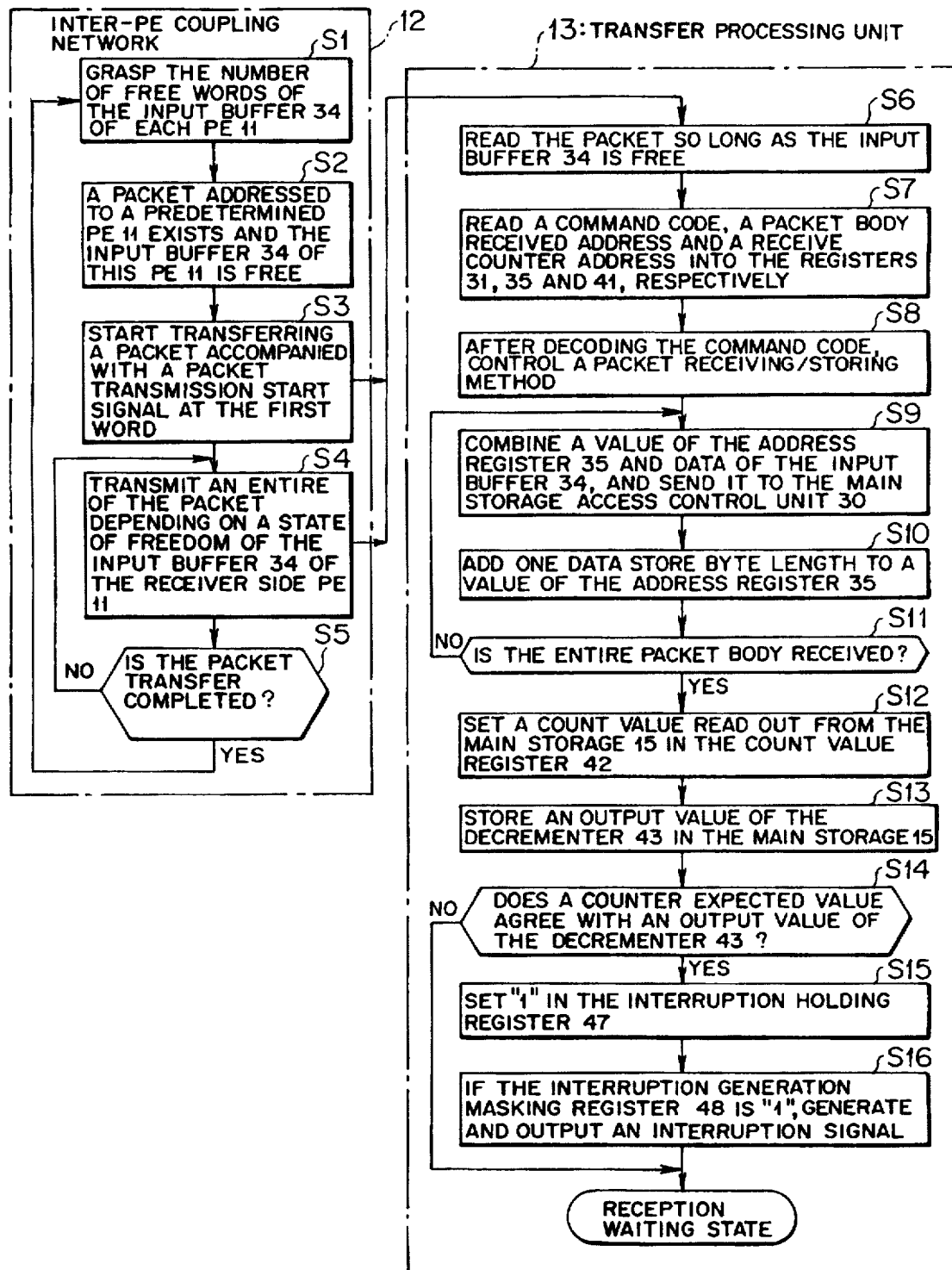
FIG. 5 is a flowchart for illustrating an operation of the processing apparatus for a parallel computer according to the first embodiment.

Next, an operation of the CPU 11 according to the first embodiment will be described with reference to a flowchart (Steps S1 through S16) in FIG. 5. For the purpose of describing an operation of, in particular, the interruption generating mechanism 24, a description will be now made of operations of the receiving system of the transfer processing unit 13 and the interruption generating mechanism 24 if the PE 11 receives a packet about a certain parallel process from another PE 11 after the PE 11 has got into the parallel synchronization state in respect to the parallel process. Assuming here that a predetermined counter expected value has been already set in the counter expected value register 44 by the condition setting mechanism 22 of the CPU 14 (the supervisor).

The inter-PE coupling network 12 always grasps the number of free words in the input buffer 34 of each PE 11 connected to the inter-PE coupling network 12 (Step S1). If a packet whose destination (a receiver side PE) is a predetermined PE 11 exists and the input buffer 34 of the receiver side PE 11 is free (Step S2), the inter-PE coupling network 12 starts transferring a packet accompanied with a packet transmission start signal at the first word (Step 3), and transfers an entire of the packet to the receiver side PE 11 depending on a state of freedom of the input buffer 34 of the receiver side PE 11 (Step S4). A process at Step S4 is repeated until the transfer of one packet is completed (until a judgement at Step S5 becomes YES). If the transfer of the packet is completed, the procedure returns to Step S1.

When the transfer of a packet from the inter-PE coupling network 12 to the receiver side PE 11 is initiated at Steps 3 and 4, the receiver system within the transfer processing unit 13 of the receiver side PE 11 reads the packet so long as the input buffer 34 is free (Step S6). At this time, each designating data is read into the corresponding register 31, 35 or 41 at a timing that each designating data in the packet header flows. More specifically, a command code is read into the command register 31, a packet body address date is read into the address register 35, and a receive counter address is read into the counter address register 41 (Step S7).

The command code read in the command register 31 at Step S7 is decoded by the decoder 32, then a signal used to control a packet receiving/storing method is generated by the control circuit 33 (Step S8).

The receiving system of the transfer processing unit 13 combines an address set in the address register 35 and packet data from the input buffer 34, sends it to the main storage access control unit 30, then stores the packet body in a designated address on the main storage 15 via the main storage access control unit 30 (Step S9).

When the packet data is stored once at Step S9, the address generating circuit 36 adds one data store byte length to an address value of the address register 35, and sets the result in the address register 35 (Step S10).

The processes at Steps S9 and S10 are repeated until the entire packet body is received (until a judgement at Step S11 becomes YES).

When receiving the entire packet body, the receiving system of the transfer processing unit 13 sends an address retained in the counter address register 41 to the main storage access control unit 30, reads a count value of the parallel process from the address on the main storage 15, and sets it in the count value register 42 (Step S12).

A count value set in the count value register 42 is subtracted 1 by the decrementer 43. After that, a result of the subtraction (a new count value) is sent to the main storage access control unit 30 as data along with data retained in the counter address register 41 as an address. Whereby, the result of the subtraction obtained by the decrementer 43 is written in the receive counter address on the main storage 15, and a count value that is information about the number of received packets in respect to a parallel process having got into a parallel synchronization waiting state is updated (Step S13).

The comparator 45 compares a counter expected value set in the counter expected value register 44 with an output value (an actual count value) of the decrementer 43 simultaneously with that the result of the subtraction obtained by the decrementer 43 is written in the main storage 15. If these values agree with each other (if a judgement at Step S14 becomes YES), a coincidence signal from the comparator 45 rises so that "1" is set in the interruption holding register 47 (Step S15).

If "1" is set as the mask information in the interruption generation masking register 48 at this time, an interruption signal "1" that should be outputted from the interruption generating circuit 46 (the AND gate 49) to the CPU 14 rises and becomes "1" (Step S16) so that an interrupting process is performed in the CPU 14.

After completion of the process at Step S16 or if comparison by the comparator 45 results in disagreement (if a judgement at Step S14 is NO), the receiving system of the transfer processing unit 13 gets into a reception waiting state.

In the PE 11 according to the first embodiment, if a parallel process in execution gets into the parallel synchronization waiting state, the number of packets transferred from another PEs 11 to own PE 11 executing the parallel process is counted by count-down. If the comparator 45 detects that the actual count value coincides with an expected value set in the counter expected value register 44 by the condition setting mechanism 22, an interruption signal is generated by the interruption generating circuit 46. Namely, the interruption generating mechanism 24 is realized with that the number of transferred packets reaches the expected value as a condition to resume allocation of the parallel process (a condition to release the parallel synchronization waiting state).

According to the first embodiment described above, a parallel process executed in the CPU 14 of the PE 11 is of only one kind. However, the first embodiment can comply with if plural jobs are executed as respective parallel processes on the parallel computer 10.

In which case, it is noted that a process identifier corresponding to each job is set in a header of a transferred packet. In addition, the interruption generating mechanism 24 is provided for each process identifier to set a counter expected value for each process identifier in the counter expected value register 44, besides a region in which an output value (a count value) of the decrementer 43 is stored is ensured on the main storage 15 for each process identifier. It is thereby possible to count the number of received packets, set a counter expected value and generate an interruption signal correspondingly to the process identifier in the packet header so as to deactivate/activate the parallel process for each job.

According to the first embodiment described above, the number of received packets are counted in subtraction (counted down) by the decrementer 43. It is alternatively possible to count the number of received packet by counting up the same by an incrementer. In which case, a value corresponding to the count-up process is, of course, set as a counter expected value in the counter expected value register 45. For instance, if a count value in the receive counter address on the main storage is "8" and the number of packets that will be received after the PE has got into the parallel synchronization waiting state is "6", "14" is set as a predetermined counter expected value.

Figure 6:
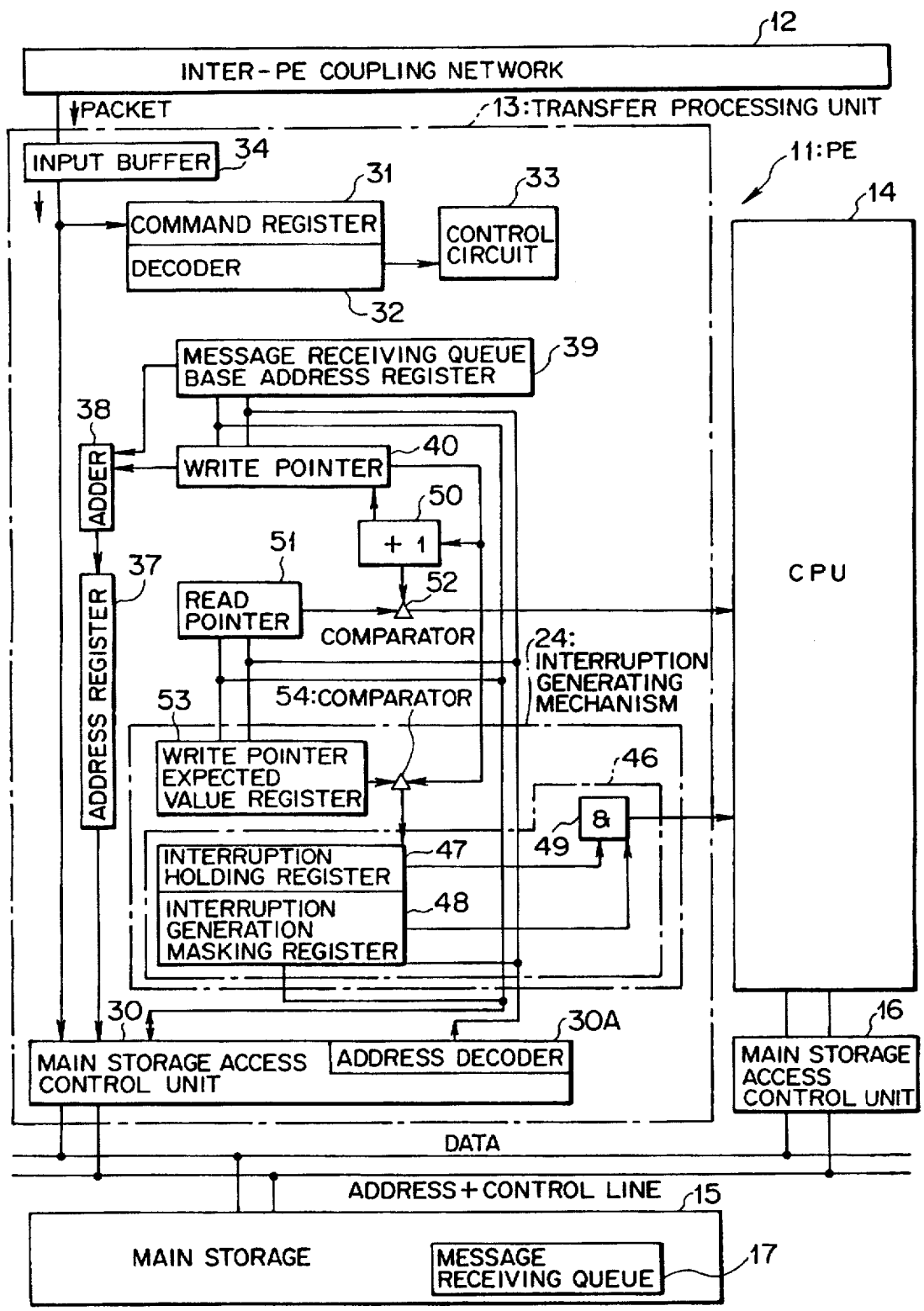
FIG. 6 is a block diagram showing a structure of an essential part of a processing apparatus for a parallel computer according to a second embodiment of this invention.

(D) Description of a Processing Apparatus for a Parallel Computer According to a Second Embodiment FIG. 6 is a block diagram showing a structure of an essential part of a processing apparatus for a parallel computer according to a second embodiment of this invention. In FIG. 6, the receiving system in the transfer processing unit 13 and the interruption generating mechanism 24 added to the receiving system are shown in detail similarly to the first embodiment. The transmitting system originally provided to the transfer processing unit 13 is omitted in FIG. 6. In FIG. 6, like reference characters designate like or corresponding parts, detailed descriptions of which are omitted here.

According to the second embodiment, it is noted that a message passing model is employed as a programming model in the parallel computer 10 and a message packet is transferred as a packet by the transfer processing unit 13.

As shown in FIG. 6, the receiving system of the transfer processing unit 13 of a PE 11 according to the second embodiment has a command register 31, a decoder 32, a control circuit 33 and an input buffer 34, which are similar to those according to the first embodiment. The receiving system of the transfer processing unit 13 also has an address register 37, an adder 38, a message receiving queue base address register 39, a write pointer 40, a one-adder 50, a read pointer 51 and a comparator 52.

The input buffer 34 temporarily retains a packet received from a transmitter side PE 11 over the inter-PE coupling network similarly to that according to the first embodiment. Data of a packet body retained in the input buffer 34 is combined with an address shown in the address register 37 and successively stored in the message receiving queue (a cyclic queue) 17 on the main storage 15 via the main storage access control unit 30, as will be described later with reference to a flowchart in FIG. 7.

The address register 37 temporarily retains an address in which a packet body retained in the input buffer 34 should be written. A value from the adder 41 is retained as address data in the address register 37.

The adder 38 successively generates a write address used when a packet body retained in the input buffer 34 is stored in the message receiving queue 17 on the main storage 15. The adder 38 adds a message receiving queue base address (a leading address of a vacancy of the message receiving queue 17) retained in the register 39 to a value of the write pointer 40, and outputs the result as the write address to the address register 37.

The write pointer 40 is set thereto 0 as an initial value. When a data writing in the main storage 15 is initiated, the value of the write pointer 40 is counted up by one by the one-adder 50 each time data for one block of the message receiving queue 17 is written in the message receiving queue 17.

An output from the adder 38 is therefore increased by one with a message receiving queue base address as an initial value each time data for one block is written. Such address value from the adder 38 is successively set in the address register 39 until all packets are written.

Data of the packet body is combined with an address successively set in the address register 37, and written in the message receiving queue 17 of the main storage 15 via the main storage access control unit 30.

The read pointer 51 indicates a read point of the message receiving queue 17 which is a cyclic queue. The comparator 52 compares a value of the write pointer obtained by adding one by the one-adder 50 with a value of the read pointer 51. If a result of the comparison is agreement, the comparator 52 judges that data overflows from the message receiving queue 17, generates an interruption signal, and outputs it to the CPU 14.

Meanwhile, the above-mentioned receiving system of the transfer processing unit 13 is provided with the interruption generating mechanism 24 similarly to the first embodiment. The interruption generating mechanism 24 in a PE 11 according to the second embodiment is realized with a write pointer expected value register 53, a comparator 54 and an interruption generating circuit similar to that according to the first embodiment, as shown in FIG. 6.

Here, the write pointer expected value register 53 is set thereto a predetermined write pointer expected value by the above-mentioned condition setting mechanism 22 of the CPU 14 (the supervisor) via the main storage access control unit 30 (the address decoder 30A) when a parallel process in process gets into the parallel synchronization waiting state. The write pointer expected value is set on the basis of a data capacity of all message packets that will be transferred from another PEs 11 from when the parallel process gets into the parallel synchronization waiting state to when another PEs 11 complete this step, which is a value considered to be indicated by the write pointer when the all message packets are received.

The comparator 54 compares a write pointer expected value set in the write pointer expected value register 53 with an actually indicated value of the write pointer 40. If these values are in agreement, the comparator 54 outputs a coincidence signal (a signal becomes "0" in the case of disagreement, and "1" in the case of agreement). It is alternatively possible that the comparator 54 outputs a predetermined signal as stated above if the comparator 54 detects that the comparison of a write pointer expected value with an actually indicated value of the write pointer 40 results in disagreement or that an actually indicated value exceeds an expected value.

The interruption generating circuit 46 generates an interruption signal to the CPU 14 (the supervisor) according to a result of comparison by the comparator 54 similarly to the first embodiment, which has an interruption holding register 47, an interruption generation masking register 48 and an AND gate 49 quite similar to those described hereinbefore.

When a coincidence signal from the comparator 54 rises so that a signal retained in the interruption holding register 47 becomes "1" in the case where "1" is set as the mask information in the interruption generation masking register 48, an interruption generating signal that should be outputted from the AND gate 49 to the CPU 14 rises and becomes "1", whereby an interrupting process is performed in the CPU 14.

Figure 7:
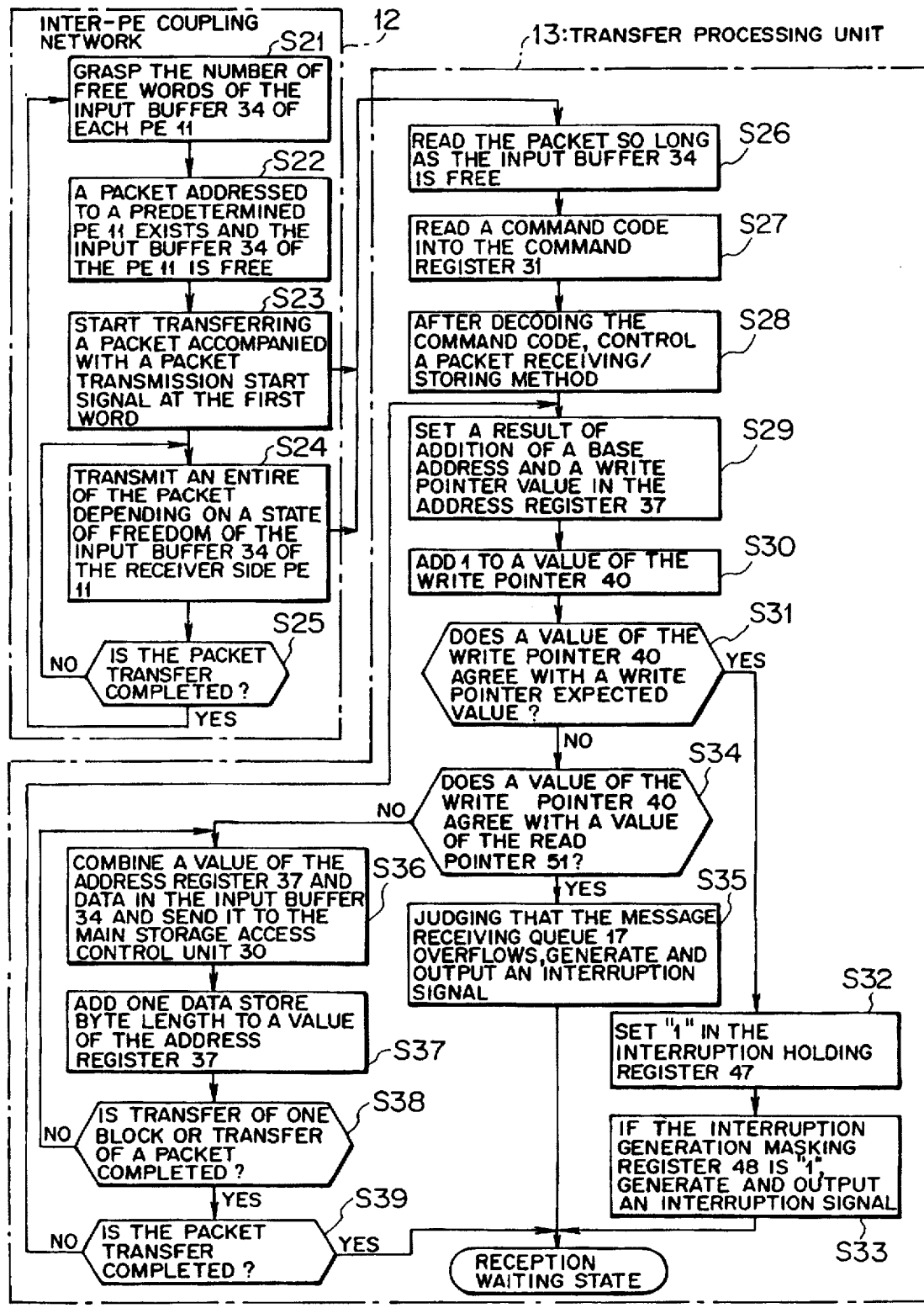
FIG. 7 is a flowchart for illustrating an operation of the processing apparatus for a parallel computer according to the second embodiment.

Next, an operation of the PE 11 according to the second embodiment will be described with reference to a flowchart (Steps S21 through S39) shown in FIG. 7. For the purpose of describing an operation of, in particular, the interruption generating mechanism 24, operations of the receiving system of the transfer processing unit 13 and the interruption generating mechanism 24 if the PE 11 receives a message packet in respect to a parallel process from another PE 11 after the PE 11 has got into the parallel synchronization waiting state in relation to the parallel process. Assuming here that a predetermined write pointer expected value has been already set in the write pointer expected value register 53 by the condition setting mechanism 22 of the CPU 14 (the supervisor) at that time.

The inter-PE coupling network 12 always grasps the number of free words of the input buffer 34 of each PE 11 connected to the inter-PE coupling network 12 (Step S21). If a message packet addressed to a predetermined PE 11 (a receiver side PE) exists and the input buffer 34 of this receiver side PE 11 is free (Step S22), the inter-PE coupling network 12 starts transferring the message packet accompanied with a packet transmission start signal at the first word (Step S23), then transfers an entire of the message packet to the receiver side PE 11 depending on a state of freedom of the input buffer 34 of the receiver side PE 11. The process at Step S24 is repeated until transfer of one message packet is completed (until a judgement at Step S25 becomes YES). When the transfer of the message packet is completed, the procedure returns to Step S21.

When the transfer of the message packet from the inter-PE coupling network 12 to the receiver side PE 11 is initiated at Steps S23 and S24, the receiving system in the transfer processing unit 13 of the receiver side PE 11 reads in the message packet so long as the input buffer 34 is free (Step S26). At this time, the receiving system reads a command code into the command register 31 at a timing that the command code within a packet header flows (Step S27). The command code read into the command register 31 is decoded by the decoder 32, then a signal used to control a packet receiving/storing method is generated by the control circuit 33 (Step S28).

In the receiving system of the transfer processing unit 13, a result of addition of a message receiving queue base address retained by the register 39 to a value of the write pointer 40 obtained by the adder 38 is set as a write address in the address register 37 (Step S29). After that, a value of the write pointer 40 is counted up by one by the one-adder 50 (Step S30).

A value (an actually indicated value) of the write pointer 40 counted up by one at Step S30 is compared with an expected value set in the write pointer expected value register 53 by the comparator 54. If these values agree with each other (if a judgement at Step S31 becomes YES), a coincidence signal from the comparator 54 rises so that "1" is set in the interruption holding register 47 (Step S32).

If "1" is set as the mask information in the interruption generating circuit 48 at this time, an interruption signal that should be outputted from the interruption generating circuit 46 (the AND gate 49) to the CPU 14 rises (Step S33) so that an interrupting process is performed in the CPU 14, the receiving system of the transfer processing unit 13 thus gets into a reception waiting state.

If the comparison by the comparator 54 results in disagreement (if a judgement at Step S31 becomes NO), the comparator 52 compares a value (an actually indicated value) of the write pointer 40 counted up by one at Step S30 with a value of the read pointer 51. If these values agree with each other (if a judgement at Step S34 becomes YES), it is judged that data overflows from the message receiving queue 17 so that an interruption signal that should be outputted from the comparator 52 to the CPU 14 rises (Step S35), which causes the CPU 14 to perform an interruption process, whereby the receiving system of the transfer processing unit 13 gets into a reception waiting state.

If the comparison by the comparator 52 results in disagreement (if a judgement at Step S34 becomes NO), the receiving system of the transfer processing unit 13 combines an address set in the address register 37 and packet data from the input buffer 34, then sends it to the main storage access control unit 30 to store the packet data in the message receiving queue 17 on the main storage 15 via the main storage access control unit 30 (Step S36).

When the packet data is stored once at Step S36, the address generating circuit not shown adds one data store byte length to an address value of the address register 37, then a result of the addition is set in the address register 37 (Step S37).

The processes at Steps S36 and S37 are repeated until transfer of packet data for one block to the message receiving queue 17 is completed or all packets are transferred to the message receiving queue 17 (until a judgement at Step S38 becomes YES).

The above-mentioned processes at Steps S29 through S38 are repeated until reception of packets is completed, that is, until all packets are transferred to the message receiving queue 17 (until a judgement at Step S39 becomes YES). If the judgement at Step S39 becomes YES, the receiving system of the transfer processing unit 13 gets into the reception waiting state.

In the PE 11 according to the second embodiment, if a parallel process gets into the parallel synchronization waiting state and the PE 11 receives a message packet from another PE 11 executing the parallel process, the received data is stored in the message receiving queue 17 on the main storage 15 according to an indicated value of the write pointer 40, besides the indicated value of the write pointer 40 is updated so as to be a leading address of the next free region of the message receiving queue 17, as described above.

If the comparator 54 detects that an actually indicated value of the write pointer 40 agrees with an expected value set in the write pointer expected value register, the interruption generating circuit 46 generates an interruption signal. Namely, the interruption generating mechanism 24 is realized with that a quantity of received message packets reaches the expected value as a condition to resume allocation of a parallel process (a condition to release the parallel synchronization waiting state).

According to the second embodiment described above, the parallel process executed in the CPU 14 of the PE 11 is of one kind. However, the second embodiment can comply with a case where plural jobs are executed as parallel processes separately on the parallel computer 10.

In which case, a process identifier corresponding to each job is set in a header of a packet that should be transferred. In addition, the interruption generating mechanism 24 is provided for each process identifier, a write pointer expected value is set in the write pointer expected value register 53 for each process identifier, the message receiving queue base address register 39, the write pointer 40, the read pointer 51 and the like are provided for each process identifier, and the message receiving queue 17 is ensured on the main storage 15 for each process identifier. With such arrangement, a data writing in the message receiving queue 17, an updating of the write pointer 40, a setting of an expected value and a generating of an interrupting signal are implemented for each process identifier correspondingly to the process identifier in the packet header, thereby deactivating/activating the parallel process for each job.

Figure 8:
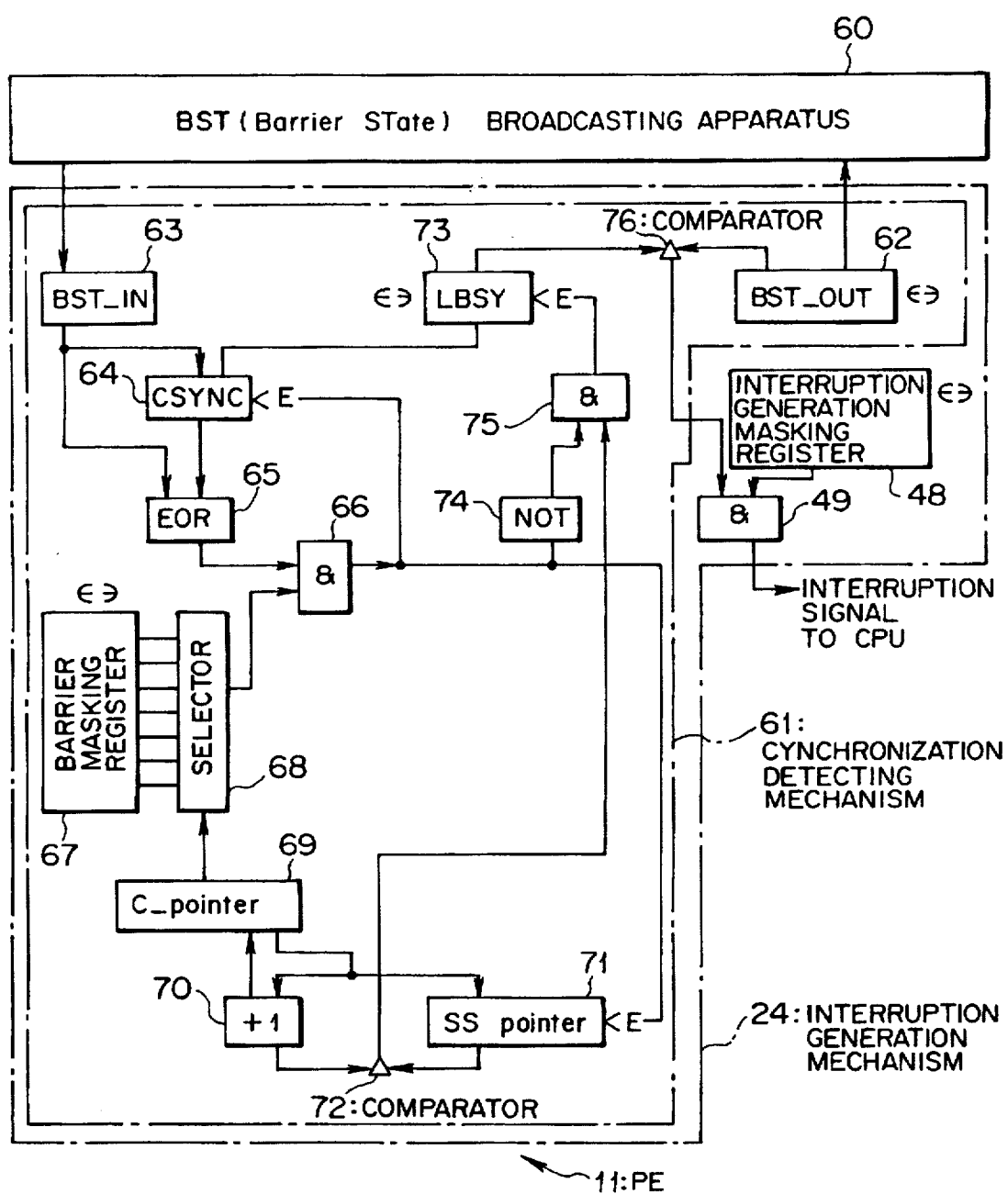
FIG. 8 is a block diagram showing a structure of an essential part of a processing apparatus for a parallel computer according to a third embodiment of this invention.
Figure 9:
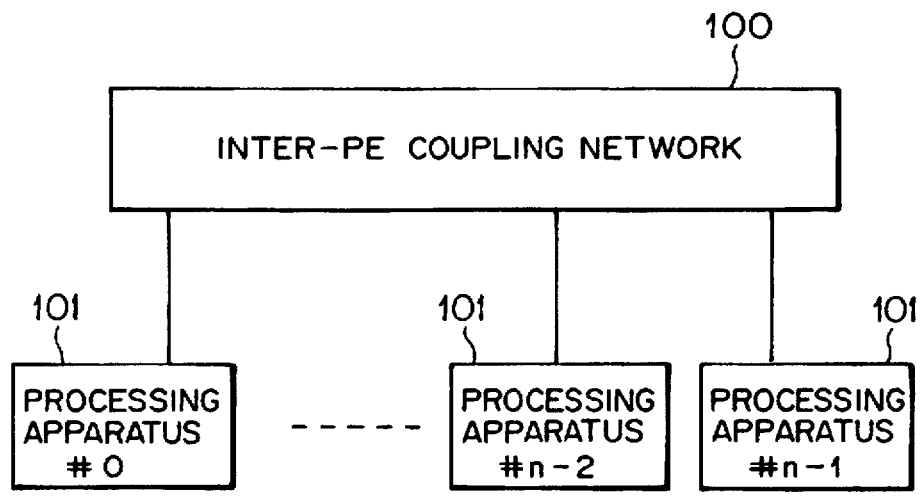
FIG. 9 is a block diagram showing a structure of a general parallel computer system.
Figure 10:
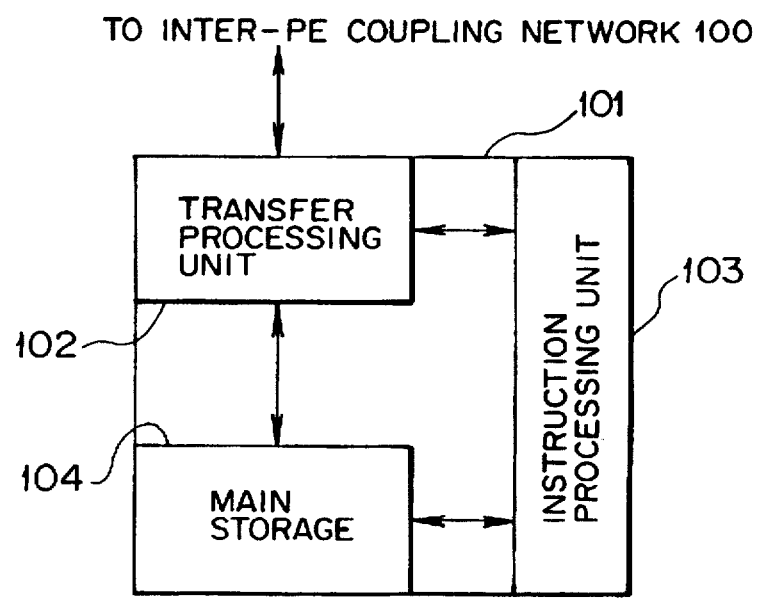
FIG. 10 is a block diagram showing a structure of a general processing apparatus for a parallel computer.

(E) Description of a Processing Apparatus for a Parallel Computer According to a Third Embodiment FIG. 8 is block diagram showing a structure of an essential part of a processing apparatus for a parallel computer according to a third embodiment of this invention. A PE 11 according to the third embodiment has an interruption generating mechanism 24 adapted to synchronization detection (barrier detection). The interruption generating mechanism 24 according to the third embodiment is configured with a synchronization detecting mechanism 61 as shown in FIG. 8, an interruption generation masking register 48 and an AND gate 49 similar to those described hereinbefore.

According to the third embodiment, the PEs 11 are interconnected by a BST (Barrier STate) broadcasting apparatus 60 as a state communicating unit. The BST broadcasting apparatus 60 is served to transmit and receive a barrier state value (a variable of one bit length) representing whether each PE 11 completes a process allocated in this step as the parallel process among plural PEs 11. For instance, the BST broadcasting apparatus 60 broadcasts a barrier state value (a value retained in an output register 62 described later) of each PE 11 to all PEs 11 in the order of PE number #0, #1, #2, . . . #(n-1), #0, #1, . . . and so on.

Each PE 11 is provided with a synchronization detecting mechanism 61 for outputting a synchronization detection signal [a signal which becomes "1" (a High level) when synchronization is detected] when detecting that all barrier state values from PEs 11 executing the parallel process obtained through the BST broadcasting apparatus 60 agree to each other.

In the interruption generating mechanism 24 according to this embodiment, the AND gate 49 calculates a logical product of a synchronization detection signal from the synchronization detecting mechanism 61 and an output of the interruption generation masking register 48, and outputs a result of the logical product as an interruption signal to the CPU 14.

More specifically, when a synchronization detection signal from the synchronization detecting mechanism 61 rises in the case where "1" is set as the mask information in the interruption generation masking register 48, an interruption generating signal that is to be outputted from the AND gate 49 to the CPU 14 rises and becomes "1" so that an interrupting process is performed in the CPU 14.

Next description will be of a structure and an operation of the synchronization detecting mechanism 61 used in the third embodiment with reference to FIG. 8.

The synchronization detecting mechanism 61 has a barrier state value output register 62, a barrier state value input register 63, a current synchronization value register 64, an exclusive-OR gate 65, an AND gate 66, a barrier masking register 67, a selector 68, a current pointer 69, a one-adder 70, a synchronization start PE number pointer 71, a comparator 72, a preceding barrier synchronization value register 73, a NOT gate 74, and an AND gate 75 and a NOT comparator 76.

In FIG. 8, "<E" represent an input of an enable signal providing a write timing for latches (the registers 64 and 73, and the pointer 71). "∈" attached to the registers 48, 62, 67 and 73 represents accessibility from the CPU 14 (a program).

The barrier state value output register 62 retains a barrier state value (BST_OUT) of its own PE 11, and outputs it to the BST broadcasting apparatus 60.

The barrier state input register 63 successively receives a barrier state value (BST_IN) of each PE 11 broadcasted from the BST broadcasting apparatus 60 as described hereinbefore, and retains it therein.

The current synchronization value register 64 retains a current synchronization value (CSYNC; Current SYNChronization value). The exclusive-OR gate (EOR) 65 calculates an exclusive OR of a value (BST_IN) of the barrier state value input register 63 and a value (CSYNC) of the current synchronization value register 64. More specifically, an output value of the exclusive-OR gate 65 becomes "1" if a value (BST_IN) of the barrier state value input register 63 differs from a value (CSYNC) of the current synchronization value register 64.

The AND gate 66 calculates a logical product of a value from the exclusive-OR gate 65 and a value from the selector 68, and outputs a result.

The barrier masking register 67 is configured as a bit string of a n bit length if n PEs 11 are provided to the parallel computer 10 of this embodiment. At a bit x (x=0 through n-1) of the barrier masking register 67, whether a barrier state value from a PE 11 of a PE number x is to be an object of parallel synchronization of this PE 11 or not is set. For example, if a barrier state value from a PE 11 of a PE number x is to be an object of parallel synchronization of this PE 11, "1" is set. If not, "0" is set.

The selector 68 selects a barrier mask value of a bit position indicated by the current pointer 69 from the barrier masking register 67, and outputs it to the AND gate 66.

The current pointer (C_pointer; Current pointer) 69 indicates a PE number of a PE 11 which has sent a barrier state value currently retained in the barrier synchronization value input register 63, and outputs it to the selector 68. An indicated value of the current pointer 69 is added 1 by the one-adder 70 each machine cycle. So long as an initial value of the current pointer 69 is appropriately set, it is possible to always coincide a value indicated by the current pointer 69 with a PE number corresponding to a barrier state value from the barrier synchronization value input register 63.

The synchronization start PE number pointer (SS_pointer; Synchronization Start pointer) 71 retains a PE number of the first PE 11 on the occasion when a barrier state value broadcasted by the BST broadcasting apparatus 60 comes to be equal to a value (CSYNC) of the current synchronization register 64. Namely, a barrier state value (BST_OUT) of a PE 11 which has a PE number falling in a region from "an indicated value of the synchronization start PE number pointer 71" to "an indicated value of the current pointer 69" when a barrier mask value of a PE number within this indicated value region is "1" is equal to a value (CSYNC) retained in the current synchronization value register 64.

The comparator 72 compares a value obtained by adding 1 to an indicated value of the current pointer 69 with a value indicated by the synchronization start PE number pointer 71. If these value agree with each other, the comparator 72 outputs "1" as a result of the comparison to the AND gate 75.

The preceding barrier synchronization value register 73 retains a barrier state value (LBSY; Last Barrier SYnchronization value) at the time of the last synchronization.

An output value of the AND gate 66 is inputted as an enable signal to the current synchronization value register 64 and the synchronization start PE number pointer 71.

The NOT gate 74 inverts an output value of the AND gate 66. The AND gate 75 calculates a logical product of an output value of the NOT gate 74 and a result of the comparison from the comparator 72, and outputs it as an enable signal to the preceding barrier synchronization value register 73.

The NOT comparator (!comparator) 76 compares a value (LBSY) retained in the preceding barrier synchronization value register 73 with a value (BST_OUT) retained in the barrier state value output register 62 in a procedure described later to detect barrier synchronization. If barrier synchronization is detected, the NOT comparator 76 outputs "1" as a synchronization detection signal.

In the synchronization detecting mechanism 61 having the above structure, an output value from the AND gate 66 becomes "1" if a transmission source PE 11 of a barrier state value received this time is an object of synchronization (if an output value from the selector 68 is "1") and the barrier state value received this time differs from a current synchronization value (CSYNC).

At a timing when an output value from the AND gate 66 becomes "1", an enable signal is inputted to the current synchronization value register 64 and the synchronization start PE number pointer 71, a value (BST_IN) of the barrier state value input register 63 is set as a value (CSYNC) of the current synchronization value register 64, and a value of the current pointer 69 is set as a value of the synchronization start PE number pointer 71. Whereby, a PE number indicated by the current pointer 69 is retained as a PE number of a PE 11 first synchronizing in the synchronization start PE number pointer 71.

A signal from the comparator 72 rises and becomes "1" if a value obtained by adding 1 to an indicated value of the current pointer 69 agrees with a value indicated by the synchronization start PE number pointer 71, that is, at a timing when barrier synchronization is detected, as described above. At this time, a PE 11 having a PE number falling in a region from "a value of the synchronization start PE number pointer 71" to "a value obtained by adding n-2 to a value of the pointer 71" synchronizes.

An output value of the NOT gate 74 becomes "1" if an output value from the AND gate 66 is "0", that is, if a barrier state value from a PE 11 having a PE number indicated by the current pointer 69 does not break current synchronization.

In consequence, if a signal from the comaparator 72 becomes "1" and an output value of the NOT gate 74 is "1", that is, at a point of time at which an output value of the AND gate 75 becomes "1", it is shown that barrier state values of all PEs 11 that are objects of synchronization are in equal to a value (CSYNC) of the current synchronization value register 64.

As described above, an output value "1" of the AND gate 75 is given as an enable signal to the preceding barrier synchronization value register 73 at a timing when an output value of the AND gate 75 becomes "1", and a value (CSYNC) of the current synchronization value register 64 is set as a value (LBSY) of the preceding barrier value register 73.

The NOT comparator (! comparator) 76 then compares a value (LBSY) of the preceding barrier synchronization value register 73 with a value (BST_OUT) of the barrier state value output register 62. A procedure of synchronization detection by the comparator 76 is as follows.

Assuming that "LBSY"="BST_OUT" before this operation. By inverting a value of "BST_OUT", "BST_OUT" !="LBSY". Here, "!" means NOT in C language, and "!=" means "not equal". When barrier state values of all PEs 11 that are objects of synchronization agree with each other, that is, when barrier synchronization is detected, "LBSY"= "BST_OUT" is set.

Therefore, a period of "LBSY" !="BST_OUT" is a period of waiting for barrier synchronization so that a period of "LSBY"="BST_OUT" is a barrier synchronization period, during which the comparator 76 outputs "1" as a synchronization detection signal.

As stated above, when a synchronization detection signal from the synchronization detecting mechanism 61 (the comparator 76) rises if "1" is set as the mask information in the interruption generation masking register 48, an interruption signal that is to be outputted from the AND gate 49 to the CPU 14 rises and becomes "1", whereby an interrupting process is performed in the CPU 14.

In the PE 11 according to the third embodiment, when a parallel process in execution gets into the parallel synchronization waiting state, a synchronization detection signal of the synchronization detecting mechanism 61 of each PE 11 is used as an interruption signal of the interruption generating mechanism 24. In other words, synchronization detection (barrier detection) of each PE 11 is used as a condition to resume allocation of a parallel process so as to realize the interruption generating mechanism 7.

In the third embodiment described above, a parallel process executed in the CPU 14 of a PE 11 is of one kind. However, the third embodiment may comply with a case where plural jobs are executed as parallel processes separately on the parallel computer 10.

In which case, a process identifier corresponding to each job is set in a header of a transferred packet. In addition, the synchronization detecting mechanism 61 realizing the interruption generating mechanism 24 is provided for each process identifier, and synchronization detection by the synchronization detecting mechanism 61 and generation of an interruption signal are implemented for each process identifier, thereby deactivating/activating the parallel process for each job.

What is claimed is:

1. A parallel process scheduling method used in a parallel computer having plural processing apparatus for executing processes individually and a communication network for communicably connecting said plural processing apparatus to each other to execute a certain job as a parallel process in synchronization in each step by two or more processing apparatus among said plural processing apparatus, said parallel process scheduling method comprising the steps of:

if each of said processing apparatus completes a process allocated in this step as said parallel process and gets into a parallel synchronization waiting state where said processing apparatus waits for another one or more processing apparatus to complete processes allocated in this step as the parallel process, in a processing apparatus in the parallel synchronization waiting state in respect to said parallel process, deactivating said parallel process in order to inhibit allocation of said parallel process, setting a condition that should be satisfied when allocation of said parallel process is resumed;

allocating a process of another job if another job executable by said processing apparatus exists; and generating an interruption signal for a process in execution when said condition is satisfied to activate said parallel process so as to resume allocation of said parallel process.

2. The parallel process scheduling method used in a parallel computer according to claim 1, wherein if data is transferred from a transmitter side processing apparatus to a receiver side processing apparatus over said communication network in packet transmission/reception implemented asynchronously with a data processing operation in said parallel computer, in a processing apparatus in the parallel synchronization waiting state in respect to said parallel process, the number of packets to be transferred from said another processing apparatus executing said parallel process to said processing apparatus is counted by count-up or count-down by a counter;

an expected value of a count value of said counter is set on the basis of the number of packets which are intended to be transferred to said processing apparatus from when said parallel process gets into the parallel synchronization waiting state to when said another processing apparatus complete a step of this time; and it is judged that said condition is satisfied if said expected value agrees with an actual counted value obtained by said counter to generate said interruption signal.

3. The parallel process scheduling method used in a parallel computer according to claim 2, wherein if plural jobs are executed separately as parallel processes, a process identifier corresponding to each job is set in a packet;

said expected value is set for each process identifier and a region in which a count value by said counter is stored is ensured on a main storage for each process identifier in each processing apparatus; and counting by said counter, setting of said expected value and generating of said interruption signal are implemented for each of said process identifier in a processing apparatus being in the parallel synchronization waiting state in respect to said parallel process.

4. The parallel process scheduling method used in a parallel computer according to claim 1, wherein in said parallel computer, if data is transferred from a transmitter side processing apparatus to a receiver side processing apparatus over said communication network in packet transmission/reception implemented asynchronously with a data processing operation, the received data is stored in a message receiving queue that is a cyclic queue on a main storage according to an added value of a base address and a write pointer besides an indicated value of said write pointer is updated to be a leading address of the next free region in said message receiving queue when a message packet that is a packet of a specific type is received;

in a processing apparatus in the parallel synchronization waiting state in respect to said parallel process, an expected value of an indicated value of said write pointer is set on the basis of information such as a data capacity and the like of all message packets that are intended to be transferred to said processing apparatus from when said parallel process gets into the parallel synchronization waiting state to when said another processing apparatus complete a step of this time; and if said expected value agrees with an actual indicated value of said write, pointer, if said expected value disagrees with an actual indicated value of said write pointer, or if an actual indicated value of said write pointer exceeds said expected value, it is judged that said condition is satisfied to generate an interruption signal for a process in execution.

5. The parallel process scheduling method used in a parallel computer according to claim 1, wherein if plural jobs are separately executed as parallel processes, a process identifier corresponding to each job is set in a message packet;

said expected value and said base address are set for each of said process identifier, and said message receiving queue and said write pointer are provided for each of said process identifier in each processing apparatus; and data writing in said message receiving queue, updating of said write pointer, setting of said expected value and generating of said interruption signal are implemented for each of said process identifier in a process apparatus being in the parallel synchronization waiting state in respect to said parallel process.

6. The parallel process scheduling method used in a parallel computer according to claim 1, wherein in said parallel computer, if a state value of one or more bits representing whether each processing apparatus completes a process allocated in this step as said parallel process or not is transmitted and received among said plural processing apparatus, and a synchronization detecting mechanism for outputting a synchronization detection signal if detecting that state values from processing apparatus executing said parallel process are all in agreement is provided to each processing apparatus, in a processing apparatus being in the parallel synchronization waiting state in respect to said parallel process, it is judged that said condition is satisfied if the synchronization detection signal is outputted from said synchronization detecting mechanism to generate an interruption signal for a process in execution.

7. The parallel process scheduling method used in said parallel computer according to claim 6, wherein if plural jobs are separately executed as parallel processes, said synchronization detecting mechanism is provided for each parallel process in said each processing apparatus, synchronization detection by said synchronization detecting mechanism and generation of said interruption signal are implemented for each parallel process in a processing apparatus being in the parallel synchronization waiting state in respect to said parallel process.

8. A processing apparatus for a parallel computer communicably connected to another plural processing apparatus over a communication network to constitute a parallel computer for executing a certain job as a parallel process in synchronization with another one or more processing apparatus among said plural processing apparatus in each step, said processing apparatus comprising:

a deactivating mechanism for deactivating said parallel process in order to inhibit allocation of said parallel process if said processing apparatus completes a process allocated in this step as said parallel process and gets into a parallel synchronization waiting state where said processing apparatus waits for said another one or more processing apparatus to complete processes allocated as said parallel process in this step;

a condition setting mechanism for setting a condition that should be satisfied when allocation of said parallel process is resumed simultaneously with deactivation of said parallel process by said deactivating mechanism;

an allocating mechanism for allocating a process of another job while said parallel process is in a deactivated state if another executable job exists;

an interruption generating mechanism for generating an interruption signal for a process in execution if said condition is satisfied; and an activating mechanism for activating said parallel process in order to resume allocation of said parallel process according to the interruption signal from said interruption generating mechanism.

9. The processing apparatus for a parallel computer according to claim 8 further comprising a transfer processing unit for transferring data to said another plural processing apparatus over said communication network in packet transmission implemented asynchronously with a data processing operation; and wherein said interruption generating mechanism comprising:

a counter for counting the number of packets transferred from said another one or more processing apparatus executing said parallel process by counting up or counting down the same if said parallel process gets into the parallel synchronization waiting state;

an expected value register being set thereto an expected value of a count value obtained by said counter by said condition setting mechanism on the basis of the number of packets that are intended to be transferred from said another one or more processing apparatus from when said parallel process gets into the parallel synchronization waiting state to when said another one or more processing apparatus complete a step of this time;

a comparator for comparing the expected value set in said expected value register with an actual counted value obtained by said counter; and an interruption generating circuit for generating said interruption signal according to a result of comparison by said comparator.

10. The processing apparatus for a parallel computer according to claim 9, wherein if plural jobs are separately executed as parallel processes, a process identifier corresponding to each job is set in a packet; and said expected value is set for each of said process identifier and a region in which a counted value by said counter is stored is ensured on a main storage for each of said process identifier.

11. The processing apparatus for a parallel computer according to claim 8 further comprising:

a transfer processing unit for transferring data to said another plural processing apparatus over said communication network in packet transmission/reception implemented asynchronously with a data processing operation;

if said transfer processing unit receives a message packet that is a packet of a specific type from said another one or more processing apparatus executing said parallel process, the received data being stored in a message receiving queue that is a cyclic queue on a main storage according to an added value of a base address and a write pointer, besides an indicated value of said write pointer being updated to be a leading address of the next free region in said message receiving queue; and wherein said interruption generating mechanism comprising:

an expected value register being set thereto an expected value of an indicated value of said write pointer by said condition setting mechanism on the basis of information such as a data capacity and the like of all message packets that are intended to be transferred from said another one or more processing apparatus from when said parallel process gets into the parallel synchronization waiting state to when said another one or more processing apparatus complete a step of this time;

a comparator for comparing the expected value set in said expected value register with an actual indicated value of said write pointer; and an interruption generating circuit for generating said interruption signal according to a result of comparison by said comparator.

12. The processing apparatus for a parallel computer according to claim 11 wherein if plural jobs are separately executed as parallel processes, a process identifier corresponding to each job is set in a message packet, and said expected value and said base address are set for each of said process identifier besides said message receiving queue and said write pointer are provided for each of said process identifier.

13. The processing apparatus for a parallel computer according to claim 8 further comprising:

a state communicating unit for transmitting/receiving a state value of one or more bits representing whether a process allocated as said parallel process in this step is completed or not to/from said another plural processing apparatus; and a synchronization detecting mechanism for outputting a synchronization detection signal if detecting that state values of all processing apparatus executing said parallel process obtained through said state communicating unit agree with each other;

said condition setting mechanism setting that the synchronization detection signal is outputted from said synchronization detecting mechanism as said condition;

said interruption generating mechanism being accomplished by said synchronization detecting mechanism, and the synchronization detection signal from said synchronization detecting mechanism being used as said interruption signal.

14. The processing apparatus for a parallel computer according to claim 13, wherein if plural jobs are separately executed as parallel processes, said synchronization detecting mechanism is provided for each of said parallel processes.

* * * * *